United States Patent [19]
Suzuki et al.

[11] Patent Number: 6,031,650
[45] Date of Patent: Feb. 29, 2000

[54] LIGHT DEFLECTING APPARATUS AND DEFLECTION SCANNING APPARATUS USING THE SAME

[75] Inventors: Yasuo Suzuki, Numazu; Mikio Nakasugi, Tama; Hideyuki Miyamoto, Numazu; Taku Fukita, Susono; Isshin Sato, Shizuoka-ken; Akihiro Fukutomi, Numazu, all of Japan

[73] Assignee: Canon Kabushiki Kaisha, Tokyo, Japan

[21] Appl. No.: 09/102,816

[22] Filed: Jun. 23, 1998

[30] Foreign Application Priority Data

Jun. 27, 1997 [JP] Japan ................................. 9-171929

[51] Int. Cl.⁷ .................................................. G02B 26/08
[52] U.S. Cl. ........................... 359/198; 359/200; 359/216
[58] Field of Search .................................... 359/196–200, 359/212–219; 310/90, 90.5; 347/259–261

[56] References Cited

U.S. PATENT DOCUMENTS

| | | | |
|---|---|---|---|
| 5,018,880 | 5/1991 | Nakasugi et al. | 384/112 |
| 5,555,124 | 9/1996 | Yoshitsugu et al. | 359/200 |

FOREIGN PATENT DOCUMENTS 8-5951  1/1996  Japan .

*Primary Examiner*—James Phan
*Attorney, Agent, or Firm*—Fitzpatrick, Cella, Harper & Scinto

[57] ABSTRACT

In a light deflecting apparatus, a sleeve formed of ceramic material is relatively rotatably fitted onto the periphery of an axis of ceramic material, a rotary polygonal mirror is mounted to a rotor portion including the axis or the sleeve, and the rotor portion is rotated by a driving motor. The axis is a rotary axis, a metal member formed of metal is mounted to the periphery of the rotary axis, and the rotary polygonal mirror is mounted to the metal member.

12 Claims, 4 Drawing Sheets

LIGHT DEFLECTING APPARATUS AND DEFLECTION SCANNING APPARATUS USING THE SAME

BACKGROUND OF THE INVENTION

1. Field of the Invention

The present invention relates to a light deflecting apparatus in which a sleeve of ceramic material is rotatably fitted onto an axis or a shaft of ceramic material, a rotary polygonal mirror is mounted to a rotor portion comprised of the axis or the sleeve, and the rotor portion is rotated by a driving motor. Such a light deflecting apparatus is used in an image forming apparatus, such as a laser beam printer and a laser facsimile apparatus.

2. Related Background Art

Conventionally, a bearing apparatus rotatable at fast speed and with high precision is required to increase precision of such a light deflecting apparatus. A dynamic pressure fluid bearing of ceramic material rotatable in a non-contact manner is used for such a bearing apparatus.

FIG. 1 illustrates a light deflecting apparatus with a dynamic fluid bearing used as a bearing apparatus which is disclosed in Japanese Patent Application Laid-Open No. 8-5951.

A stationary axis or shaft 22 of ceramic material is fixed to a housing 21 of a driving motor. A rotary sleeve 24 of ceramic with a cover 23 at its upper end is rotatably fitted onto the stationary axis 22. A flange 25 of metal, such as aluminum and brass, is fixed to the periphery of the rotary sleeve 24 using shrinkage fit or the like. A driving magnet 26 is fixed to the periphery of the flange 25 using adhesive or the like. Further, a base plate 27 is fixed onto the housing 21, and a stator 28 is arranged on the base plate 27 opposingly to the driving magnet 26. The driving motor is thus constructed.

On the other hand, a first permanent magnet 29 is mounted to a lower end of the rotary sleeve 24. A second permanent magnet 30 is fixed onto the housing 21 such that different magnetic poles of those magnets 29 and 30 are opposed to each other in a vertical direction. Thus, the rotary sleeve 24 is floated by such magnetic reaction, and an air pool 31 is formed between the stationary axis 22 and the cover 23. A through hole 23a is formed in the cover 23 to make a vent between the air pool 31 and its exterior. A plug 32 is removably fitted into the through hole 23a. Further, a rotary polygonal mirror 34 is fixed to the flange 25 by a leaf spring 33 fixed to the rotary sleeve 24.

With such a structure, when the rotary sleeve 24 is to be fitted onto the stationary axis 22 with the plug 32 detached from the hole 23a, the sleeve 24 can be readily fitted onto the axis 22 since air is vented from the sleeve 24 through the hole 23a. Further, when the rotary sleeve 24 is rotated, the sleeve 24 is supported in a radial direction by an air film between the sleeve 24 and the axis 22 and supported in a thrust direction by the reaction acting between the permanent magnets 29 and 30. At this time, the air sealed within the air pool 31 by the plug 32 functions to damp a vertical motion of the rotary sleeve 24, so that the rotary sleeve 24 is stably maintained at its floated position.

The above-discussed bearing apparatus comprised of those stationary axis and the rotary sleeve, however, has the following disadvantages.

When the flange 25 of metal is fixed to the rotary sleeve of ceramic using the shrinkage fit, a bore of the sleeve 24 is likely to deform and hence after-working is required, leading to an increase in cost.

Further, when the polygonal mirror 34 is to be fitted onto the rotary sleeve 24 of ceramic, precise working of the periphery of the sleeve 24 is needed, also leading to an increase in cost.

Furthermore, when a groove is formed on the rotary sleeve 24 of ceramic to fit therein the leaf spring 33 for fixing the polygonal mirror 34 onto the flange 25, ceramic used for the sleeve 24 is likely to be cracked or broken and there is a fear that cracked powders get in the dynamic pressure bearing to damage the bearing. Moreover, formation of the groove on the periphery of the sleeve of ceramic is difficult, leading to an increase in cost.

SUMMARY OF THE INVENTION

An object of the present invention is to provide a light deflecting apparatus and a deflection scanning apparatus using this light deflecting apparatus, in which the above disadvantages are dissolved, its fabrication cost is relatively low, and rotatable support and deflection scanning at high speed and with high precision are stably enabled over a long time.

A light deflecting apparatus of the present invention for achieving the object is directed to a light deflecting apparatus in which a sleeve formed of ceramic material is relatively rotatably fitted onto the periphery of an axis or a shaft of ceramic material, a rotary polygonal mirror is mounted to a rotor portion including the axis or the sleeve, and the rotor portion is rotated by a driving motor. In this deflecting apparatus, the axis is a rotary axis, a metal member formed of metal is mounted to the periphery of the rotary axis, and the rotary polygonal mirror is mounted to the metal member.

DETAILED DESCRIPTION OF THE PREFERRED EMBODIMENTS

Embodiments of the present invention will be described with reference to FIGS. 2 to 4.

Figure 1:
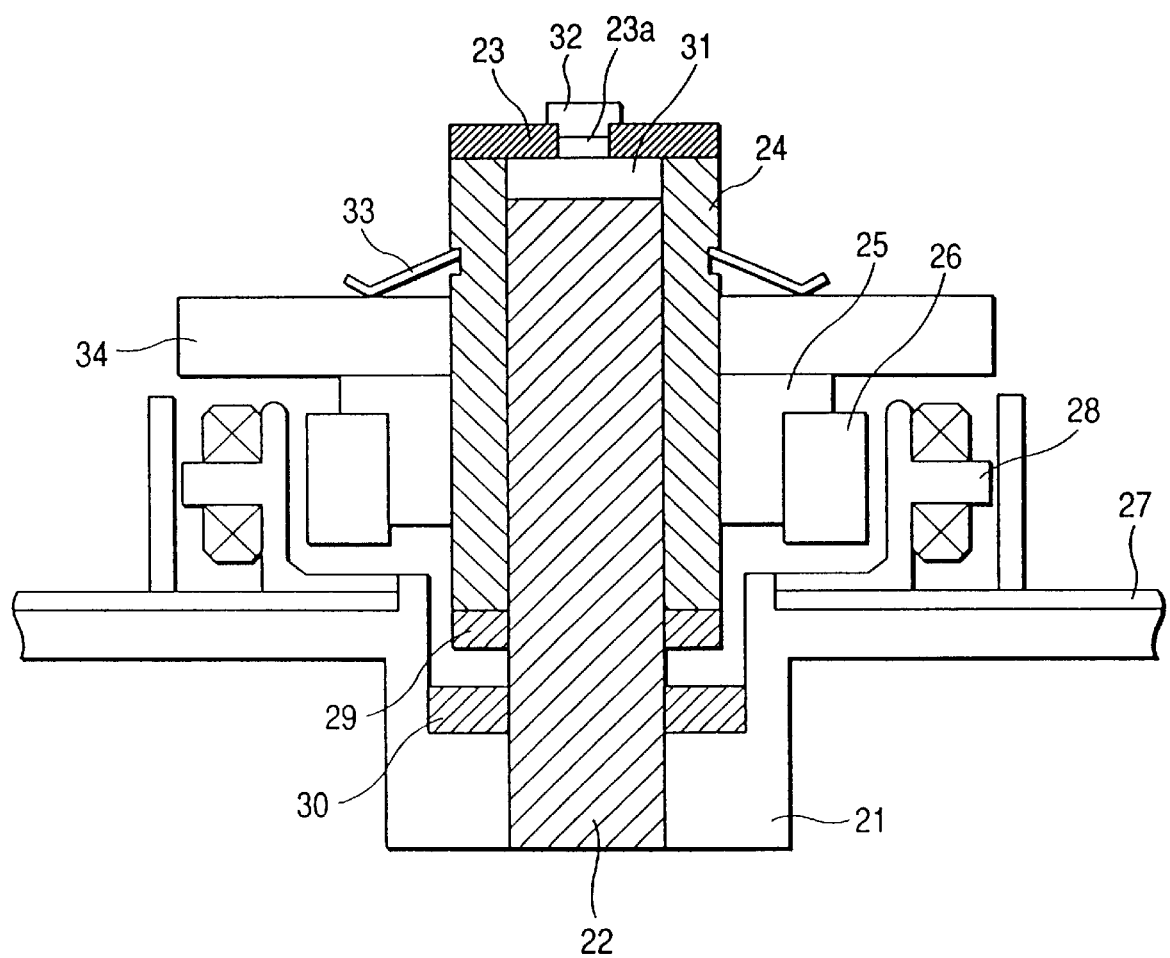
FIG. 1 is a view illustrating the structure of a prior art light deflecting apparatus.
Figure 2:
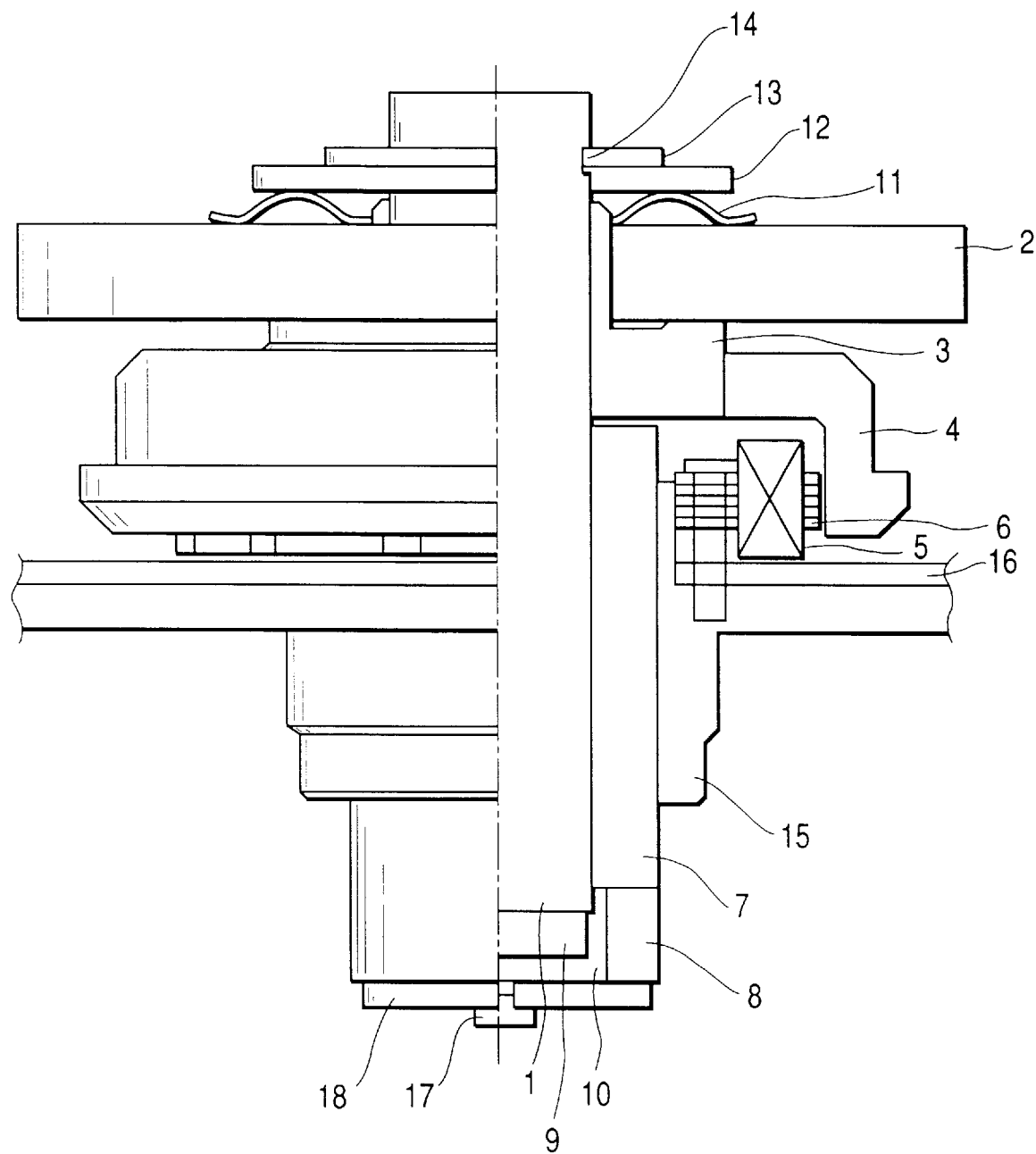
FIG. 2 is a view illustrating the structure of a first embodiment of a light deflecting apparatus according to the present invention.

FIG. 2 is a cross-sectional view illustrating a light deflecting apparatus using a bearing apparatus of a dynamic pressure fluid bearing.

As shown in FIG. 2, a stationary sleeve 7 (a portion of a stator portion) formed of ceramic material is fixed to a housing 15 of a driving motor, and a rotary axis or shaft 1 (a portion of a rotor portion) of ceramic material with a second permanent magnet 9 at its lower end is rotatably fitted into the stationary sleeve 7. A metal member 3 (a portion of the rotor portion) formed of metal, such as aluminum and brass, is fixedly mounted to the periphery of the rotary axis 1, using shrinkage fit or the like.

Further, a groove 14 is formed on the periphery of the rotary axis 1 into which a fixing member (a grip ring 13) is to be mounted or fixed. The fixing member urges and fixes a rotary polygonal mirror 2 to a receiving seat, with the aid of a leaf spring 11 and a cap member 12.

The metal member 3 includes the seat for receiving the polygonal mirror 2 and a fitting portion onto which a bore of the polygonal mirror 2 is fitted. Further, a driving magnet 4 of plastics is mounted and fixed to the periphery of the metal member 3. The driving motor includes this driving magnet 4.

The stator, which is comprised of a coil 5 and core 6, is arranged on a base plate 16 fixed to the housing 15 opposingly to the driving magnet 4. The driving motor is thus constructed.

On the other hand, a first permanent magnet 8 is mounted to a lower end of the stationary sleeve 7. The second permanent magnet 9 is fixed to the lower end of the rotary axis 1 opposingly to the first permanent magnet 8. A cover 18 is mounted to a lower end of the first permanent magnet 8, and an air pool 10 is thus formed.

The first and second permanent magnets 8 and 9 are provided such that their magnetic poles, opposed to each other in a direction (a radial direction) perpendicular to an axial direction, differ from each other. The rotary axis 1 is thus floated due to a magnetic force acting between the two permanent magnets, and hence the air pool 10 is formed between the rotary axis 1 and the cover 18. A through hole is formed in the cover 18 to make a vent between the air pool 10 and its exterior. A plug 17 is detachably mounted into the through hole.

With such a structure, when the rotary axis 1 is to be fitted into the stationary sleeve 7 with the plug 17 detached from the hole, the rotary axis can be readily fitted into the stationary sleeve 7 since air in the sleeve 7 is vented through the hole. Further, when the rotary axis 1 is rotated, the rotary axis 1 is supported in a radial direction by an air film between the stationary sleeve 7 and the rotary axis 1 and supported in a thrust direction by the magnetic force acting between the first and second permanent magnets 8 and 9. At this time, the air sealed within the air pool 10 functions to damp a vertical motion of the rotary axis 1, so that the rotary axis 1 is stably maintained at its floated position.

Since the polygonal mirror is mounted to the periphery of the metal member, the working of the fitting portion can be readily performed due to the metal member, leading to a decrease in cost.

Further, since the rotary axis of ceramic material has a large rigidity, deformation of the rotary axis is small and vibration of the deflection scanning apparatus can be suppressed even when the axis rotates at high speed.

Furthermore, since the specific gravity of the ceramic material is smaller than that of the metal, the force of inertia of a rotary body (the rotary axis of ceramic material) is also small and hence the deflection scanning apparatus can be speedily started.

Figure 3:
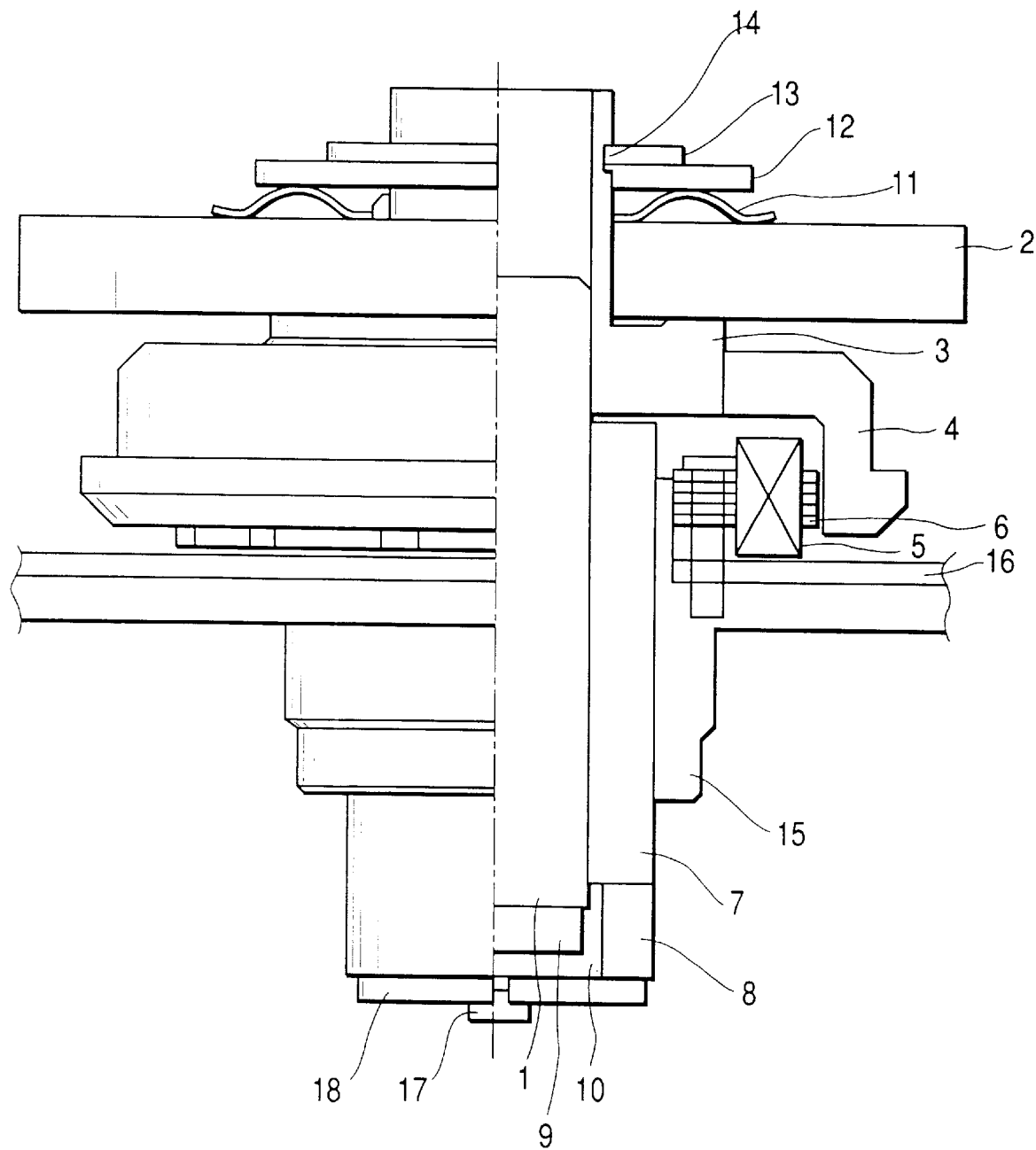
FIG. 3 is a view illustrating the structure of a second embodiment of a light deflecting apparatus according to the present invention.

FIG. 3 illustrates a second embodiment of the present invention. In the second embodiment, the metal member 3 used in the first embodiment is extended upward. The fixing member is thus fixed to the metal member 3. The fixing member fixes the rotary polygonal mirror 2 to the rotary portion comprised of the metal member 3. In FIG. 3, the same members as those in FIG. 2 are designated by the same reference numerals, and their explanations are omitted.

The metal member 3 includes the seat for receiving the polygonal mirror 2, a fitting portion onto which a bore of the polygonal mirror 2 is fitted, and a groove 14 into which the fixing member (the grip ring 13) is mounted or fitted. The fixing member urges and fixes the polygonal mirror 2 to the receiving seat with the aid of the leaf spring 11 and the cap member 12.

In the second embodiment, the following advantage can be obtained in addition to the advantages of the first embodiment. Since the groove, into which the fixing member (the grip ring) for fixing the polygonal mirror to the rotor portion, is formed in the metal member mounted to the periphery of the rotary axis of ceramic, there in no fear that the ceramic material of the rotary axis would be cracked. Therefore, rotatable support and deflection scanning at high speed and with high precision are stably enabled over a long term.

Further, there is no need of formation of the groove on the periphery of the rotary axis of ceramic, leading to a reduction in cost.

Further, the length of the rotary axis of ceramic material can be shortened compared with the first embodiment, also leading to a reduction in cost.

Figure 4:
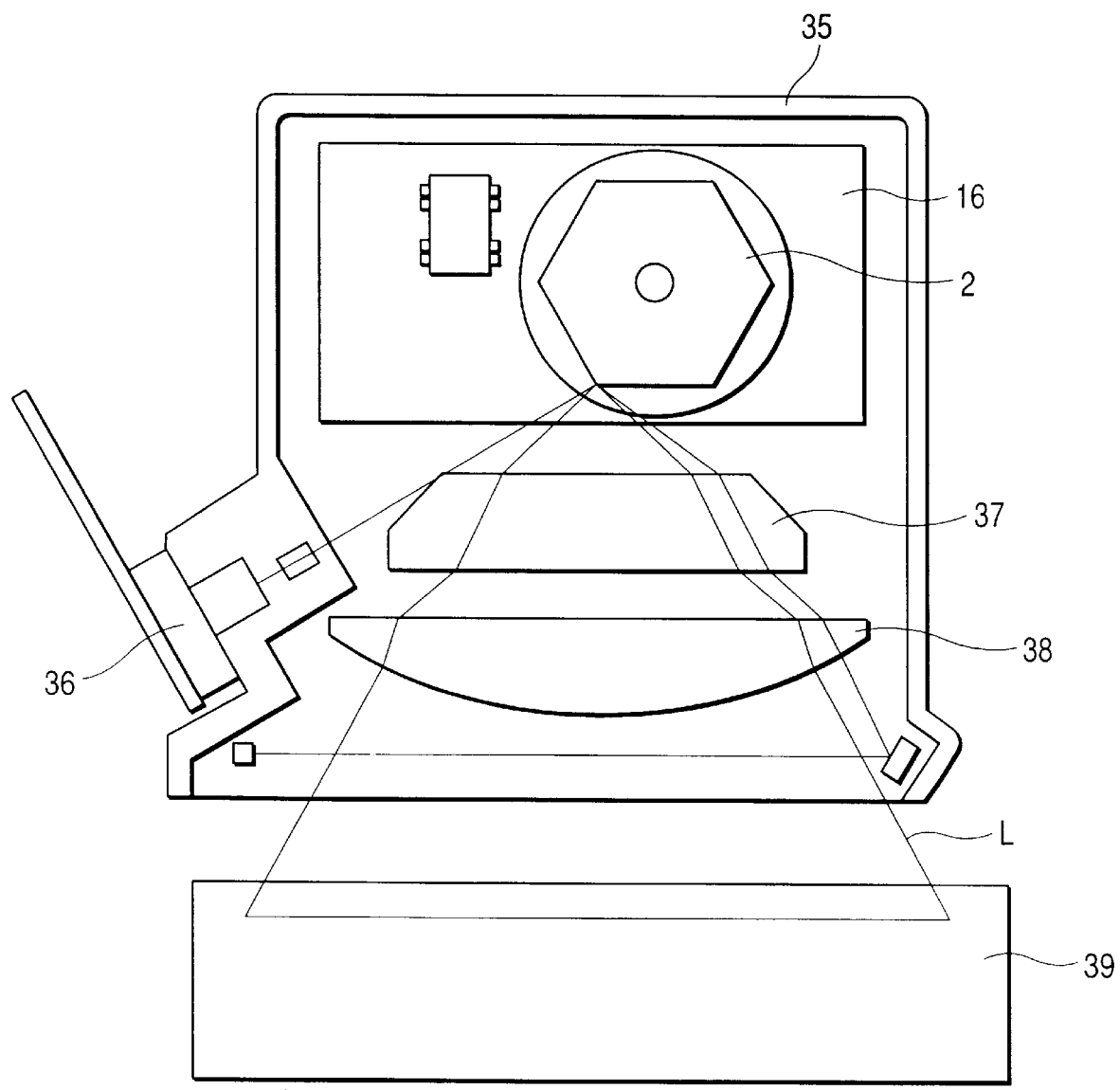
FIG. 4 is a view illustrating the overall structure of a scanning optical system.

FIG. 4 illustrates the overall structure of a scanning optical system in a deflection scanning apparatus using the light deflecting apparatus of the above embodiment. A laser unit 36 is arranged in an optical box 35. The rotary polygonal mirror 2 and lenses 37 and 38 are arranged along an optical path from the laser unit 36 in the optical box 35. A photosensitive body 39 of a recording medium is arranged outside the optical box 35. The housing 15 of the driving motor is disposed in the optical box 35.

Laser light emitted from the laser unit 36 is deflected by the polygonal mirror 2 which is supported and rotated by the bearing apparatus illustrated in FIGS. 2 and 3. The deflected light is projected as a spot on the photosensitive body 39 located outside the optical box 35, through the lenses 37 and 38. Thus, a main scanning is performed.

There are arranged around the photosensitive body 39 a corona discharger for uniformly charging a surface of the photosensitive body 39, a developer for visualizing as a toner image an electrostatic latent image formed on the photosensitive body 39, a transferrer for transferring the toner image onto a recording paper, and the like. Recording information caused by the laser light from the laser unit 36 is printed on the recording paper or the like.

There can be provided a scanning optical system in which its fabrication cost is relatively low, and deflection scanning at high speed and with high precision is stably enabled over a long time, by using the light deflecting apparatus of this embodiment.

As described in the foregoing, in a light deflecting apparatus of the present invention, a sleeve formed of ceramic material is relatively rotatably fitted onto the periphery of an axis of ceramic material, a rotary polygonal mirror is mounted to a rotor portion including the axis or the sleeve, and the rotor portion is rotated by a driving motor. In addition to this structure, the axis is a rotary axis, a metal member formed of metal is mounted to the periphery of the rotary axis, and the rotary polygonal mirror is mounted to the metal member. Therefore, in the light deflecting apparatus of the present invention, its manufacturing cost is relatively low, and rotatable support and deflection scanning at high speed and with high precision are stably enabled over a long time.

What is claimed is:

1. A light deflecting apparatus comprising:

a stationary sleeve formed of ceramic material;

a rotary axis formed of ceramic material, said rotary axis being rotatably fitted into said stationary sleeve;

a metal member formed of metal, said metal member being mounted to a periphery of said rotary axis;

a deflector for deflecting a light beam, said deflector being mounted to said metal member; and a fixing member for fixing said deflector to said metal member, said fixing member being mounted to said metal member.

2. A light deflecting apparatus according to claim 1, said deflector comprising a rotary polygonal mirror.

3. A light deflecting apparatus according to claim 1, said metal member including a receiving seat for receiving said deflector.

4. A light deflecting apparatus according to claim 1, said metal member including a groove for fitting said fixing member therein.

5. A deflection scanning apparatus comprising:

a light source;

a stationary sleeve formed of ceramic material;

a rotary axis formed of ceramic material, said rotary axis being rotatably fitted into said stationary sleeve;

a metal member formed of metal, said metal member being mounted to a periphery of said rotary axis;

a deflector for deflecting a light beam from said light source, said deflector being mounted to said metal member; and a fixing member for fixing said deflector to said metal member, said fixing member being mounted to said metal member.

6. A deflection scanning apparatus according to claim 5, said deflector comprising a rotary polygonal mirror.

7. A deflection scanning apparatus according to claim 5, said metal member including a receiving seat for receiving said deflector.

8. A deflection scanning apparatus according to claim 5, said metal member including a groove for fitting said fixing member therein.

9. An image forming apparatus comprising:

a light source;

a recording medium;

a stationary sleeve formed of ceramic material;

a rotary axis formed of ceramic material, said rotary axis being rotatably fitted into said stationary sleeve;

a metal member formed of metal, said metal member being mounted to a periphery of said rotary axis;

a deflector for deflecting a light beam from said light source, said deflector being mounted to said metal member; and a fixing member for fixing said deflector to said metal member, said fixing member being mounted to said metal member.

10. An image forming apparatus according to claim 9, said deflector comprising a rotary polygonal mirror.

11. An image forming apparatus according to claim 9, said metal member including a receiving seat for receiving said deflector.

12. An image forming apparatus according to claim 9, said metal member including a groove for fitting said fixing member therein.

* * * * *